(Model.)

R. L. KESTER.
Piston Packing.

No. 243,379.　　　　　　　Patented June 28, 1881.

WITNESSES
John A. Ellis
Philip L. Ellis

INVENTOR
Robert L. Kester
by Anderson & Smith
his ATTORNEYS

UNITED STATES PATENT OFFICE.

ROBERT L. KESTER, OF PHILADELPHIA, PENNSYLVANIA.

PISTON-PACKING.

SPECIFICATION forming part of Letters Patent No. 243,379, dated June 28, 1881.

Application filed November 13, 1880. (Model.)

*To all whom it may concern:*

Be it known that I, ROBERT L. KESTER, of Philadelphia, in the county of Philadelphia and State of Pennsylvania, have invented a new and valuable Improvement in Piston-Packings; and I do hereby declare that the following is a full, clear, and exact description of the construction and operation of the same, reference being had to the annexed drawings, making a part of this specification, and to the letters and figures of reference marked thereon.

Figure 1:
Figure 2:
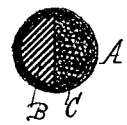
Figure 3:
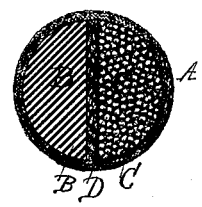

Figure 1 of the drawings is a representation of a side of my device. Figs. 2 and 3 are transverse sectional views, showing different forms of packing.

This invention relates to packings for decreasing friction.

The invention consists in the construction hereinafter described.

In the drawings hereto annexed, A represents the webbing which constitutes the covering for the packing.

B is the rubber back, and C the facing, composed as hereinafter described.

In making this packing, I take a rubber strip, B, of semi-cylindrical form, and weave about the same the tubular webbing A, the webbing fitting snugly the curved surface *b* of the rubber, leaving a space within the webbing upon the opposite side of the rubber. Globules of some anti friction metal—such as lead, Babbitt metal, or some of the well-known materials—are mixed with plumbago and some wax which is readily dissolvable, and the mixture heated slightly to make it run. This mixture is poured into the space between the webbing A and flat side of the rubber as the web is being woven, and takes a set therein, so that as the web is woven about the rubber strip and the mixture is poured the packing is made.

In large packings a strip of canvas, D, or some tough material, is to be placed upon the flat side of the rubber, so as to come between said rubber and the mixture and prevent the metal in the latter from abrading the former.

Instead of plumbago and wax any good lubricant can be mixed with the metal, as before described.

In use this packing is to be placed with its rubber portion toward the stationary surface, thus making an elastic back, while the other portion is against the moving surface. As the moving surface rubs by the packing the globules of metal work their way through the webbing and the lubricant comes with them, and the latter, together with the anti-friction metal, forms a smooth surface for the moving part and reduces the friction.

What I claim is—

1. A packing consisting of an exterior casing and an interior filling composed of india-rubber and a mixture of globules of anti-friction metal, plumbago, and a lubricant, substantially as described.

2. A filling for packings consisting of a semi-cylindrical strip of rubber and a mixture of globules of lead, plumbago, and a lubricant.

3. The combination of an exterior casing and a filling composed of a semi-cylindrical strip of india-rubber, a mixture of globules of anti-friction metal, plumbago, and a lubricant, with a strip of tough material interposed between the mixture and the rubber, substantially as described.

In testimony that I claim the above I have hereunto subscribed my name in the presence of two witnesses.

ROBERT L. KESTER.

Witnesses:
PHILIP C. MASI,
JAMES J. SHEEHY.